United States Patent Office 3,491,173
Patented Jan. 20, 1970

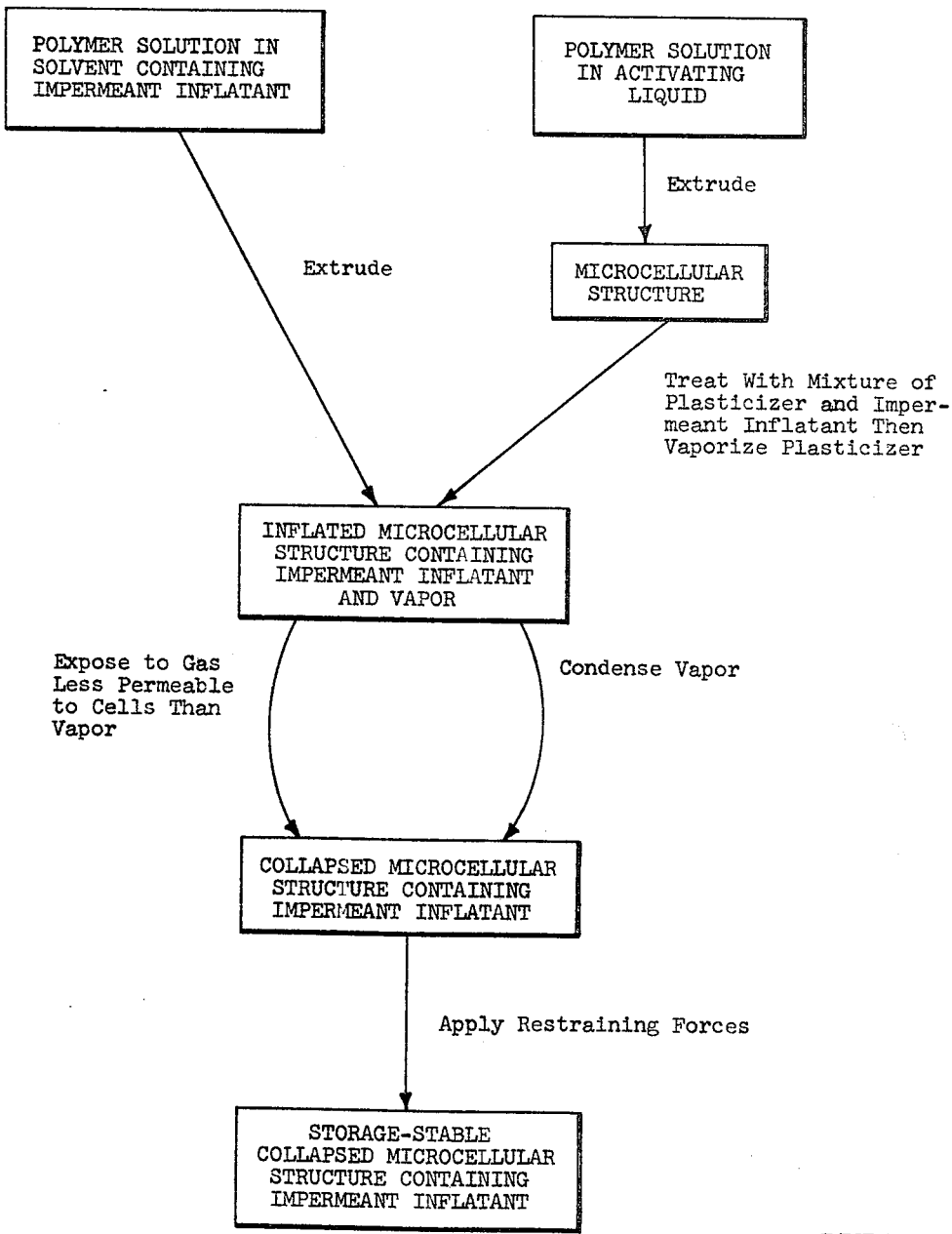

3,491,173
METHOD FOR PRODUCING A SUBSTANTIALLY COLLAPSED STORAGE-STABLE, SELF-INFLATABLE MICROCELLULAR STRUCTURE
Henry Kobsa, Waynesboro, Va., assignor to E. I. du Pont de Nemours and Company, Wilmington, Del., a corporation of Delaware
Continuation-in-part of application Ser. No. 302,722, Aug. 16, 1963. This application Feb. 14, 1967, Ser. No. 615,906
Int. Cl. B29h 7/20; D01d 5/12; B29d 27/00
U.S. Cl. 264—53                            9 Claims

ABSTRACT OF THE DISCLOSURE

A microcellular structure which can be stored and shipped in collapsed, dense form then self-inflated at point of use is made by providing a structure containing within its cells an impermeant inflatant and a highly permeant or condensable gas, reducing the pressure in the cells by outward diffusion or condensation of the latter substance while maintaining the external pressure to collapse the structure, then applying mechanical restraint to the structure to prevent self-reinflation. Self-reinflation occurs upon subsequent removal of the restraint.

CROSS-REFERENCES

This application is a continuation-in-part of application S.N. 302,722, filed Aug. 16, 1963, and now abandoned.

BACKGROUND

Field

The invention relates to collapsed microcellular structures and more particularly to a process for preparing such structures which are adapted to be self-reinflated upon release of a confining mechanical restraint.

Prior art

Many varieties of foams of organic polymers have been provided by the prior art. A particular species of such foams which has low density, closed polyhedral-shaped cells, and is resilient, called herein microcellular structures, has found use in various applications ranging from shock protection and load support to thermal insulation. Since such foams can be produced in sheet, filament or other shaped or bulk form, these microcellular structures are well adapted to a great variety of end uses.

Notwithstanding their advantageous features, experience has shown that for certain purposes the utility of these materials may be frequently restricted by their salient functional features. Thus in particular, the low density/high bulk of the microcellular structures which is especially desirable for many end uses, creates a distinct cost disadvantage in storage and in transportation and handling operations. In the case of shipments between distant geographical locations, the expenses involved with extremely light weight bulky materials can readily become prohibitive. While seemingly these problems might partially be obviated by simply producing the microcellular structures at the location where they are to be utilized, the expense and complexity of the necessary manufacturing equipment would ordinarily make such practice impractical.

SUMMARY

Accordingly it is an object of the invention to produce microcellular structures which can be stored and shipped in a substantially collapsed, relatively dense form, and which can be self-reinflated to a low density pneumatic form at the point of use merely by removal of a confining mechanical restraint.

The present invention comprises reducing the pressure inside the cells of a microcellular structure and allowing external atmospheric pressure to collapse the structure to less than ½ its fully inflated volume while maintaining within the cells a quantity of an impermeant inflatant gas, and applying mechanical restraining forces to said collapsed structure to prevent substantial self-reinflation thereof.

Such collapsed microcellular structures are self-reinflatable in that the volume of gas within the cells thereof, hence also the relative bulk of the structures, can be markedly increased in the presence of air by merely removing the mechanical restraint. On the other hand the collapsed structures will not self-reinflate in air so long as they are maintained under mechanically restraining forces such as tension. The self-reinflatable characteristics of the products are largely the result of a critical selection of polymer/impermeant inflatant combinations as hereinafter described.

It will be apparent from the foregoing that the invention provides a simple and highly effective means for largely overcoming the costly and cumbersome problems heretofore associated with the handling, storage and transportation of microcellular structures. Even more important for many purposes, the collapsed air inflatable structures are adapted to be expanded in place to produce articles of a desired shape.

DESCRIPTION

In one embodiment, the process of the invention involves extruding a polymer solution under such conditions to produce an expanded or inflated microcellular structure which quickly and spontaneously collapses by a factor of at least two. By a judicious selection of certain additives, e.g., the impermeant inflatant, the collapsed form is also unstable in that air from the atmosphere would normally diffuse osmotically into the cells of the structure to cause its reinflation. Before the collapsed structure can self-reinflate in the atmosphere, however, it is subjected to and maintained under mechanical restraining forces. For example, the structure is freshly extruded as a sheet, filament or other elongated shaped material and is maintained in a collapsed condition by winding about a core under tension. In this form the product is a storage stable article, since the collapsed structure will not reinflate until the mechanical restraint is removed such that air or other gases are able to diffuse into the cells.

In another embodiment, a preferred microcellular structure is treated in a fluid bath to introduce a quantity of impermeant inflatant into the closed cells. On removal from the bath the structure collapses spontaneously by a factor of at least two. As in the first embodiment, before the collapsed structure can self-reinflate in the atmosphere, it is subjected to and maintained under mechanical restraining forces.

Microcellular structures are normally produced by the extrusion of a solution containing a high molecular weight synthetic organic polymer, a suitable solvent, and, optionally, an impermeant inflatant. The solution, maintained at a temperature above the boiling point of the solvent and a pressure substantially above atmospheric pressure, is extruded through an orifice into a region of lower pressure and temperature, normally room temperature at about one atmosphere. Immediately upon extrusion into the low pressure and temperature region, substantially all of the solvent evaporates adiabatically. As a result, a large number of vapor bubbles are created in the solution and sufficient heat is absorbed as the solvent vaporizes to lower the temperature of the confining polymer below the polymer softening point. This step occurs very rapidly, usually in less than $10^{-2}$ seconds, and therefore effectively freezes the polymeric cell walls formed during the bubble expansion.

As essential feature of the process of the present invention comprises catching a microcellular structure in a transient, collapsed, impermeant-inflatant-containing condition and immediately mechanically confining the structure. Accordingly, in the first embodiment, referred to above, the transient collapsed state required is preferably produced by exposing to air (or an atmosphere of an even less permeant gas) a freshly extruded microcellular structure prepared as described above from a polymer solution comprising a given number of moles of a solvent whose vapor permeates the polymeric cell walls at least twice as fast as air, and less than said number of moles of a volatile impermeant inflatant. The cells of the nascent inflated cellular structure will therefore contain, in addition to the required impermeant inflatant vapor, at least ½ atmosphere partial pressure of the solvent vapor. Within a short period of time, usually less than about 10 seconds or so, the solvent vapor permeates through the cell walls and escapes from the cells at a rate faster than air permeates in to take its place, thus decreasing the internal gas pressure to the point where external atmospheric pressure crushes and collapses the cellular structure to at least twice its fully inflated density. Normally, this collapsed condition is only transient, as air continues to diffuse into the partly collapsed cells to reinflate them, driven by the osmotic pressure gradient created by the continued presence in the cells of the impermeant inflatant. It is the discovery of this invention that this transient collapsed state may be "trapped" and confined indefinitely by mechanical compressive or tension forces until self-reinflation is subsequently desired. Thus, while the density of the collapsed structure is at least twice that of the fully inflated product, preferably while the density is at a maximum, the structure is wound under tension, or placed under a static load or is otherwise subjected to mechanical restraining forces to prevent the self-reinflation. Depending on the exact relative permeation rates of the solvent and air, as well as the original quantity of each in the cells, the stage of maximum or near maximum collapse persists for an appreciable period of time (1 minute or so), and the mechanical confinement may successfully be accomplished at any time within this period.

Alternatively, the polymer/solvent/impermeant inflatant solution may be extruded into an atmosphere of a gas which is even less permeant than air to facilitate outward diffusion of the solvent vapor and prevent substantially all inward diffusion of air or other gases.

In the event a gaseous or liquid nucleation assistant such as carbon dioxide or nitrogen is added to the initial polymer solution to provide increased bubble nucleation on extrusion, it too must be highly permeant or otherwise incapable of preventing collapse of the extrudate. Certain non-fluid nucleation assistants such as the silicates which remain as solid particles in the product do not, of course, impair spontaneous deflation.

In a second embodiment a preformed microcellular structure is immersed at about atmospheric pressure in a fluid bath consisting of a mixture of an impermeant inflatant and a plasticizer for the polymer. When the polymeric cell walls are thus plasticized, the normally impermeant inflatant penetrates into the cells. The microcellular structure is subsequently transferred from the bath into the air (or into an atmosphere of a gas even less permeant than air), the plasticizer volatilizes rapidly and permeates out of the structure to leave the cell walls unplasticized (thus "trapping" the impermeant inflatant inside the cells) and reducing the internal gas pressure to less than ½ atmosphere. At this point the system is analogous to the freshly extruded foam generated in the first embodiment, and an analogous spontaneous transient collapse and spontaneous self-reinflation will occur, providing the plasticizer is at least twice as permeant as air, and is present initially at a partial pressure of at least ½ atmosphere. In this embodiment, the collapsed inflatant-containing microcellular structure is again subjected to mechanially restraining forces to preserve the collapsed state.

In modifications of both foregoing embodiments, it is possible to choose solvents, plasticizers, or impermeant inflatants whose boiling points are above room temperature. In such cases, condensation of the vapor to a liquid on cooling the sample to room temperature will reduce the internal gas pressure and lead to the spontaneous collapse, the required factor of two being obtained when the condensable vapor is initially present at a partial pressure of at least ½ atmosphere.

The ability of collapsed microcellular structures to be capable of self-reinflation depends not only upon the particular configuration and construction of the cells but also upon the interaction of the confined impermeant inflatant and the synthetic polymer which forms the cell walls. Still an additional factor which contributes to the self-reinflatable characteristic involves the permeant nature of air; more particularly, the ability of air to diffuse into the cells of the structure before the impermeant inflatant can diffuse outwardly therefrom. In this respect it is to be understood that the so-called "air permeability" property of the cell walls is attributed not to porosity in the sense of openings, but rather to the ability of the walls to selectively permit diffusion therethrough of certain vapors. In effect the walls are semi-permeable such that air will osmotically diffuse from a high air partial pressure side of a wall through the wall to a low air partial pressure side of that wall until the respective fugacities are equal. On the other hand, osmotic diffusion through the walls by a highly impermeant gas will be restrained irrespective of whether or not such a partial pressure differential exists.

It has now been discovered that the partially collapsed closed cell microcellular structures containing a quantity of impermeant inflatant may be maintained collapsed indefinitely even though exposed to an atmosphere of air, so long as an external mechanical restraint or confinement is applied. In these structures, the osmotic self-reinflation driving force is counterbalanced by the external mechanical restraint. When the collapsed structure is eventually released, osmotic self-reinflation to a stable, fully inflated cellular structure will occur as long as a sufficient quantity of inflatant remains in each cell. The magnitude of the minimum mechanical restraint required is numerically equal to the internal pressure of the impermeant inflatant, but mechanical restraining forces in excess of this minimum are also operable.

The mechanical restraint can be accomplished in any convenient fashion, as by stuffing the transient collapsed product into a bag or metal cage, or by common baling methods employing confining straps. Also found satisfactory, is simply storing the collapsed cellular structure under dead load. Alternatively and in a preferred embodiment, the structure can conveniently furnish its own restraint, as when multiple layers of a collapsed foam sheet or fiber are wound on a core under tension. In any case, each of the collapsed cells retains its quantity of the impermeant inflatant, so that self-reinflation occurs when the mechanical restraint is removed. Consequently the collapsed cellular products may be stored and shipped in relatively dense form and self-reinflated at a point of use by simply releasing the mechanical restraint. This permits large scale generation of the cellular structures at some central site with economical storage, shipping, and use of the product at remote locations.

Suitable solvents and plasticizers for use in the present invention must either have a normal boiling point above room temperature, and/or permeate the cell walls faster than air (or whatever atmosphere surrounds the structure) permeates the walls in order to reduce the vapor pressure inside the cells and obtain the initial spontaneous collapse of the microcellular structures. Furthermore, in order that the structure collapse to a density at least twice its fully inflated density, the initial concentration of solvent/plasticizer vapor inside the inflated cells must correspond to a partial pressure of at least ½ atmosphere (unless the impermeant inflatant condenses to a liquid at room temperature). Furthermore, since vaporization of the solvent is the required mechanism for generating the cells and quenching the cell walls (cf. first embodiment), the boiling point of the solvent must be lower than the softening temperature of the polymer. For solvents/plasticizers whose boiling points are above room temperature, either the liquid must lose its plasticizing ability at room temperature (otherwise the impermeant inflatant would "leak" out of the cells) or else permeate out of the polymer rapidly to leave the cell walls unplasticized. Plasticizer/solvent liquids which have been found suitable for certain polymers in the process of this invention include methylene chloride, fluorotrichloromethane, pentane, hexane, and methanol.

The function of the inflatant contained within the cells of the products of the invention is to afford an osmotic driving force which, upon release of the mechanical restraint, will cause inflation of the structure. Accordingly such inflatant must be "impermeant" by which is meant not only that its permeability coefficient for diffusion through the cell walls be lower than that of air but also such permeability coefficient be essentially zero; that is, the inflatant must be incapable of permeating the same cell walls at room temperature, e.g., below 40° C., at such a rate that ½ or more thereof will escape to an air atmosphere by diffusion within 1 day's time, preferably 1 month's time or longer. These restrictions guarantee, first, that the inflatant will be incapable of permeating the cell walls, e.g., outwardly from the sample, as fast as air can permeate the cell walls, e.g. into the sample, for otherwise full inflation of the cells could not be achieved upon release of the mechanical forces and exposure to an air atmosphere. Secondly, they guarantee that the collapsed structure retain its inflation activator (the impermeant inflatant) for a reasonable storage period. Considerable economic benefits accrue from being able to work with collapsed cellular filaments or sheets in the primary production area, particularly with regard to rewinding and web slitting operations. For such purposes an impermeant inflatant "lifetime" of 1 day is ample. However for inventory, storage purposes and shipping operations, longer lifetimes are usually required, e.g. of one month or longer.

The minimum quantity of inflatant contained in each cell is of significance in realizing an adequate osmotic driving force to obtain reliable and reasonably rapid self-inflation when the mechanically restraining forces are removed from the collapsed structure. Thus a major number of the cells should contain at least some quantity of impermeant inflatant. Since the inflatant must exist in a gaseous condition to create an osmotic driving force, it must be either a gas at room temperature or be capable of vaporizing at a temperature below the melting point of the synthetic polymer defining the walls. In practice it has been found that the inflatant must be capable of generating a vapor pressure of at least 30 mm. Hg at a temperature of 25° C. in order to reliably provide well defined cavities into which the external air will diffuse in reasonable periods of time. Therefore, if the vapor pressure of the inflatant in the partially collapsed cells is at least 30 mm. at room temperature, the structure will normally self-inflate merely upon exposure to the atmosphere. Frequently an added step of briefly heating the structure, above room temperature but below the polymer softening point, to increase the partial pressure of the inflatant will assist in reducing the time necessary for full inflation to occur.

Higher internal inflatant pressures are of course operable, and are in fact preferred, particularly when the confining cellular structure has walls near the upper thickness limit (2 microns) or when the polymer comprising the walls possesses a high flexural modulus (above 100,000 p.s.i.) at room temperature. However, when high inflatant pressures are employed, it should be recognized that the mechanical confining forces must be capable of counterbalancing the inflatant partial pressure in order to maintain the structure in a collapsed state as long as required.

The rate of permeation for an inflatant through a given polymer increases as its diffusivity and solubility increase. Accordingly, candidates for impermeant inflatants should have as large a molecular size as is consistent with the required 30 mm. minimum vapor pressure, and have little solvent power or affinity for the confining polymer cell walls. A preferred class of such inflatants is exemplified by compounds whose molecules have chemical bonds different from those found in the confining polymer, a low dipole moment, and a very small atomic polarizability. Furthermore, it is advantageous, though not necessary, that the inflatant be a high vapor pressure solid or liquid under ambient conditions in order that small quantities of solid or liquid phase inflatant may be present in each partially collapsed cell, in addition to the inflatant vapor. For such systems the inflatant vapor is replenished from the solvent or liquid inflatant "reservoir" as the collapsed structure inflates, thus maintaining the full osmotic driving force up through the stage of full inflation. Materials which are non-gaseous at room temperature and atmospheric pressure are preferred since for a given weight they occupy less volume; hence, the bulk of collapsed structures can be appropriately minimized. Products containing the normally liquid or solid inflatants need at most only be heated in the atmosphere to vaporize a part of the inflatant and to thereby spontaneously cause rapid inflation.

Suitable impermeant inflatants according to the invention are represented by sulfur hexafluoride and saturated aliphatic and cycloaliphatic compounds having at least one fluorine to carbon covalent bond and wherein the number of fluorine atoms exceeds the number of carbon atoms. Preferably the saturated aliphatic and cycloaliphatic compounds are, respectively, perhaloalkanes and perhalocycloalkanes in which at least 50% of the halogens are fluorine. Although the aliphatic and cycloaliphatic inflatants may contain ether-oxygen linkages, they are preferably free of nitrogen atoms, carbon to carbon double bonds and reactive functional groups. Specific examples of inflatants include sulfur hexafluoride, 1,1,2-trichloro-1,2,2-trifluoroethane, sym - dichlorotetrafluoroethane, perfluorocyclobutane, perfluoro-1,3-dimethyl cyclobutane, and perfluorodimethyl cyclobutane isomeric mixtures. Mixtures of two or more inflatants can often be used to advantage.

Aside from the foregoing characteristics, it will be understood that the impermeant inflatants must be inert, i.e., be thermally stable under extrusion conditions, and chemically and hydrolytically stable under ambient conditions. For certain uses it will be recognized that toxic compounds should be avoided.

The polymers employed in accordance with the invention are members of the class of high molecular weight synthetic polymers. Since the polymer walls of the microcellular structures are film-like with a thickness of less than 2 microns, the polymer must accordingly be of at least film-forming molecular weight.

A further requirement of the polymer relates to the strength and resiliency which cell walls thereof impart to the microcellular structure. Thus the polymer must impart sufficient strength to the structure that the particular cellular nature thereof not be destroyed upon inflation, e.g. so as to resist rupture or a significant stretching of the cell walls. For this reason the polymer should have a yield strength of at least 1000 p.s.i. as measured by the test method of ASTM D 638–59. On the other hand, for inflation to occur such that maximum bulk values are obtained, the polymer composed structure must be such that in expanded condition it be "yieldable," e.g. resilient such that substantial deformation occurs under internal-external pressure differentials, meaning differences, of one atmosphere or less (since this is the order of magnitude of the pressure differentials available for collapse and inflation). By substantial deformation is meant that the microcellular structure in expanded condition, i.e. having an internal pressure of at least about one atmosphere with few if any buckles and wrinkles in the cell walls, is yieldable such that its volume can be compressed by at least 10% under a load of 10 pounds per square inch sustained for a period of 1 second with recovery of at least about 50% of its original volume on release of the load. Structures which do not compress to that extent are entirely too rigid and hence do not afford a sufficient degree of resiliency to respond to pressure differentials. Moreover, if the sample does not sufficiently recover after release of the load, then it is not sufficiently flexible to resist fracturing and rupturing of the cell walls.

Obviously, to be useful in this invention, the microcellular products must have cells of the closed variety which are unruptured even in a collapsed condition. By closed is meant that at least a major proportion by number of cells in any microcellular sample possesses a plurality of defining walls, i.e. unruptured walls, which wholly encapsulate an inner space or void. For practical purposes mere visual or microscopic examination will often readily reveal whether or not a particular cellular structure predominates in closed or open cells. Particularly this is true in the case when the identity of the polymer and the conditions of cell formation are known. Otherwise the closed-cell content of a yieldable sample may be determined by the gas displacement method of Remington and Pariser, "Rubber World," May 1958, p. 261, modified by operating at as low a pressure differential as possible to minimize volume changes of the yieldable closed cells.

An essential feature of the polymer which constitutes the cell walls is that it exhibits selective permeability to different gases; in particular, be permeable with respect to air but less permeable with respect to inflatant vapors. Without this feature efforts to achieve full expansion would be unsuccessful for the reason the inflatant would be prematurely lost before sufficient air had entered the cells. The class of crystalline and crystallizable polymers is well suited for achieving this function.

Particularly preferred for the present invention is that species of microcellular structure called "ultramicrocellular" as defined in U.S. Patent 3,227,664, when these are prepared in closed-cell form. This preference is based on the superior inflatant retention abilities of such ultramicrocellular structures, along with their excellent strength, and other desirable properties.

Examples of synthetic organic polymers suitable for producing microcellular structures in accordance with this invention thus include polyhydrocarbons such as linear polyethylene, stereo-regular polypropylene or polystyrene; polyethers such as polyformaldehyde; vinyl polymers such as poly (vinyl chloride) and polyvinylidene fluoride; polyamides both aliphatic and aromatic, such as polyhexamethylene adipamide and the polyamide from 2,2, bis p-aminophenyl propane and isophthalic acid; polyurethanes, both aliphatic and aromatic, such as the polymer from ethylene bischloroformate and ethylene diamine; polyesters such as polyhydroxypivalic acid and polyethylene terephthalate; copolymers such as polyethylene terephthalate-isophthalate, and equivalents. The polymers should have a softening point of at least about 40° C., as indicated by passing a stick of solid polymer in sliding contact with a heated metal bar and observing the bar temperature at which a streak of molten polymer is first formed. Polymer properties such as solubility, melting point, etc. are usually reflected in the properties of the cellular product.

As is clear from the foregoing disclosure, the polymers suitable for use in preparing the cellular structures of this invention must have a reasonable permeability to air at room temperature, e.g. have a permeability for nitrogen of at least $10^{-13}$ cc.$^a$/cm.$^{2b}$/sec./cm.$^c$/cm. Hg$^d$ and a lesser permeability (e.g. 100 or more times smaller) for suitable impermeant inflatants.

The techniques of this invention make possible the economical production of microcellular structures at one central location while still taking advantage of storing and shipping the products in a substantially collapsed form. Other advantages which also accrue from this technique include, for example, the fact that the collapsed structures will exhibit a volume expansion of at least 2 times on self-reinflation upon, at most, mere exposure to air at an elevated temperature. Therefore, upon removal of the mechanical restraint the collapsed structures can be immediately placed inside a confining shape such as an airplane wing, refrigerator door, life jacket cover, etc., whereupon the expansion will completely fill (and reinforce, if adhesives or thermal bonding is employed) the confining structures. A further advantage lies in the fact that the structures can be preshaped, for example by the extrusion process itself, before they are collapsed so that the identical shape is regenerated on subsequent self-reinflation.

Among the numerous modifications which are possible, it will be apparent that the products of the invention can be provided to contain common polymer additives such as dyes, pigments, antioxidants, delusterants, antistatic agents, reinforcing particles, adhesion promoters, removable particles, ion exchange materials, U.V. stabilizers and the like by inclusion of such with the polymer solution prior to extrusion or by other suitable treatments.

The following examples serve to further illustrate this invention. All parts therein are by weight unless otherwise specified.

*Example I.*—A mixture of 40 parts isotactic polypropylene of melt flow rate (at 230° C.) of 4, 45 parts methylene chloride (fast permeating solvent) and 5 parts perfluorocyclobutane (impermeant inflatant) is heated to 145° C. under a pressure of 1500 p.s.i. The solution is passed through a valve to reduce the pressure to 400 p.s.i. just prior to extrusion at a velocity of 150 y.p.m. through a 3″ diameter annular die with a 5 mil slot and a 100 mil land. The continuous length cellular tube so produced is flattened to form a double thickness sheet. Shortly after extrusion the sheet undergoes a substantial reduction in thickness occasioned by the partial collapse of the cells. At this point the transient sheet is wound on a core (under a tension of 0.1 pound/lineal inch) located 25 yds. downstream of the extrusion orifice. The wrapping tension furnishes sufficient mechanical restraint to maintain the product in a substantially collapsed form as evidenced by a package density of 4.5 lbs./cubic foot. By wrapping a multitude of layers in contact with each other about a core under even a modest tension, e.g. 0.005 p.l.i., extremely high compressive forces are formed within the roll. One week later the package is unwound, and the sheet self-reinflates to a density of 1.5 lbs./cubic foot. The diameter of the polyhedral cells in the inflated product ranges from 100–150 microns, with a cell wall thickness of 1 micron.

The criticality of winding the sheet in its initial transient collapsed state is demonstrated by re-winding the post-inflated air-containing cellular sheet, again under a ten- ---
$^a$ Cc. of gas at STP.
$^b$ Cm.$^2$ of surface.
$^c$ Cm. of sample thickness.
$^d$ Pressure difference across sample.

sion of 0.1 p.l.i. This tension compresses the pneumatic sheet only to a package density of 2 lbs./cubic foot.

*Example II.*—The solution of Example I is extruded at a pressure of 600 p.s.i. through a 150 hole spinneret, each hole being 35 mils diameter x 180 mils long. The microcellular fibers thus produced are collected directly in a burlap bag which is filled in approximately one minute. At this point the fibers are still in their transient collapsed state, and are kept confined by closing the bag. This bag, whose contents have an apparent density of 1 lb./cubic foot, may be stored and shipped. Three days later, the bag is cut open and the contents self-reinflate to yield a batt having a density of 0.3 lb./ft.$^3$. The expanded filaments thereof are found to have a fiber density of 1.2 lb./cubic foot.

*Example III.*—A mixture consisting of 34 parts methylene chloride (solvent), 6 parts perfluorocyclobutane (impermeant inflatant), 1 part butyl alcohol and half a part of a finely divided solid nucleating agent ("Cab-O-Sil" silica aerogel, product of Godfrey L. Cabot, Inc.) is injected at 1600 p.s.i.g. into an extruder at 180° C. containing molten isotactic polypropylene of melt flow 0.4 at 230° C. ("Profax" 6823 resin made by Hercules Powder Company) in a continuous process. The mixture flow rate is 104 g.p.m. and the polymer flow rate is 156 g.p.m. The resulting polymer solution flows into an accumulator at a constant pressure of 800 p.s.i.g. and is held in the accumulator for half a day during which time the temperature of the solution is dropped from 180° C. to 155° C. The solution is then passed through a valve to reduce the pressure to 590 p.s.i.g. prior to extrusion at a velocity of 260 y.p.m. through a die which consists of two concentric circles of holes with a mean diameter of 3¼". The circumferences of the two circles are 0.090" apart. There are 65 evenly-spaced holes 0.040" in diameter with a land length of 0.300" in each of the two circles. The die has a shroud perpendicular to the die face 0.50" wide and 0.32" deep. A screen pack of two 20-mesh screens, and one 100-mesh screen fits into the die holder above the die cap. The continuous length cellular tube so produced is slit with a knife placed just below the die and then spread open so that a single flat sheet passes through a set of pinch rolls below the die. The rolls are operated just fast enough to pull the microcellular sheet away from the die without excessive tension.

On extrusion of the mixture through the die, the liquids flash evaporate within a fraction of a second to generate a foam structure of closed cells. The flashing overinflates these cells to maximum dimensions with solvent and inflatant vapors. Diffusion of these vapors out of the cells occurs simultaneously with diffusion of air from the atmosphere into the cells, but each with a different rate. After the flashing point the dimensions of the foam start to shrink (deflate) to a minimum. Most of the shrinkage occurs within 15±5 seconds after extrusion. The foam then stays at minimum dimensions at room conditions in the atmosphere for about 5 minutes. Recovery (reinflation) of these shrunk dimensions is noticed when the net effect of the diffusion of air into the collapsed cells becomes apparent. This is a slow diffusional process which takes 2±1 day to achieve final stable dimensions. Based on these recovered dimensions (about 0.95 cm. thick and 30 cm. wide) the flashing width and thickness is about 125% of the final width and thickness. The fully deflated width is about 60% of the final width and the fully deflated thickness is about 50% of the final thickness. The length shows a change of ±2% of the final length. These dimensional changes depend upon the spinning variables which are part of the previously described process..

A length of the deflated sheet is wound on a core at the end of the deflation period (after the diffusion of the solvent out of the cells) under a tension of 0.1 lb./linear in. to make a roll 8" in diameter (40 layers). Masking tape is used to stop the roll from unwinding by taping the top layer of the roll. Such a wrapping tension furnishes sufficient mechanical restraint to maintain the product in a substantially collapsed form. During storage of such a wound roll, high compressive forces are formed within the roll itself. This is due to the partial expansion of the outer layers as well as the edges of the roll. This partial expansion occurs because of the accessibility and diffusion of air into these sections. Other sections of the roll where the mechanical confinement is more effective show no growth during a period of two weeks of storage. During this period of storage the rolls keep their general shape and the sheets do not tear themselves.

At the end of the two weeks period on release of the restraint, the dimensions of the unwound sheet are initially still essentially those of the collapsed form. Variation in the width is from 70–85% of the control sample, and in the thickness from 47–86% of the control sample, the higher numbers referring to the outer layers of the roll. The control is a sample which sat on a bench during the period of storage without mechanical restraint. The density of the sample stored with restraint varies from two to four times that of the control (0.012 g./cc.). The higher density refers to the layers which were next to the core. Reinflation of the restrained foam proceeds on release. One week after the package is unwound, the sheets reinflate to a final width and thickness of 90–99% of the control. The final density is from 1.00–1.25 times that of the control, the higher density is found in the sections which were next to the core during storage. Examination of the cell structure of such a restrained sheet, which later was allowed to reinflate by itself, shows no difference from the cell structure of the control.

*Example IV.*—A polypropylene microcellular sheet is prepared by extruding a solution of 45% isotactic polypropylene of melt flow 0.4 (Hercules' "Profax" 6823), 52.1% fluorotrichloromethane and 2.9% 1,2-dichlorotetrafluoroethane at a temperature of 144±1° C. and a pressure of 500±20 p.s.i.g. through an annular die having a 12.5 mil gap and 0.31" land. A blown-tube process is used, employing just sufficient internal pressure to remove pleats from the tubular product. The polyhedral closed cells average 11 mils in diameter and the basis weight of the sheet is 0.45 oz./yd.$^2$. A strip 4" wide and 10' long is cut from this fully-inflated product for the following experiment.

The foam strip, wound in a loose roll, is immersed for 5 minutes in a fluorotrichloromethane bath (plasticizer), transferred directly to a 50/50 volume bath of fluorotrichloromethane/1,2 - dichlorotetrafluoroethane (inflatant) for 15 minutes and finally to a pure 1,2-dichlorotetrafluoroethane bath. After 15 minutes a section of the foam strip about 1' long is pulled out of this last bath. This 1' section immediately shrinks in width and thickness as the cells spontaneously collapse, and the collapsed strip is wound by hand around a ½" diameter aluminum rod using just enough tension to form a firm roll. Succeeding 1' sections are handled in similar fashion until the whole strip is wound about the aluminum rod. A Teflon® polytetrafluoroethylene coated open mesh (.2 x .2" apertures) fabric is wrapped about the roll and secured by 2 bands of copper wire to provide mechanical restraint preventing the collapsed foam from self-reinflating. The dimensions of the foam roll are 2.16" diameter by 3" wide.

Twenty-four hours later the roll is unwound and allowed to self-reinflate standing in air at room temperature. The portion of the strip which had been the outer layer of the roll has an "embossed" appearance where the collapsed foam partially reinflated through the apertures of the confining fabric. After 16 hours recover, the self-reinflated strip is rewound onto the ½" aluminum rod, now forming a roll of 3.20" diameter for a "cross section" expansion of approximately $(3.20/2.16)^2 = 2.2X$. The width of the strip has also recovered to 4". The embossed pattern is no longer evident following full self-reinflation. The density of the inflated product is 0.0108 g./cc.

I claim:
1. A method of producing a substantially collapsed, storage-stable, self-inflatable microcellular structure which comprises:
 (a) providing an inflated microcellular structure containing within its closed cells an impermeant inflatant and at least ½ atmosphere partial pressure of a condensable or permeable vapor, said microcellular structure being a resilient cellular structure of a synthetic organic polymeric material having closed, polyhedral-shaped cells defined by film-like cell walls less than 2 microns in thickness and exhibiting selective permeability to different gases, said impermeant inflatant being a substance having a permeability coefficient for diffusion through the cell walls of essentially zero and capable of generating a vapor pressure of at least 30 mm. Hg. at 25° C.
 (b) collapsing the microcellular structure to less than ½ its inflated volume by reducing the pressure within the cells provided by said vapor while maintaining the external pressure on the structure, and
 (c) applying mechanical restraining forces to the collapsed structure to prevent substantial reinflation thereof.

2. Method as defined in claim 1 wherein said vapor is at least twice as permeant to the cell walls as air and wherein the structure is collapsed by exposing it to an atmosphere of a gas which is no more permeant to the cell walls than air.

3. A method as defined in claim 2 wherein said inflated microcellular structure is produced by providing a solution containing a high molecular weight synthetic organic polymer, a solvent whose vapor permeates the cell walls at least twice as fast as air, and an impermeant inflatant, the number of moles of inflatant being less than the number of moles of solvent, the solution being maintained at a pressure substantially above atmospheric and at a temperature above the boiling point of the solvent, extruding the solution through an orifice into a region of lower pressure and temperature to vaporize the solvent and precipitate the polymer.

4. A method as defined in claim 3 wherein the solution is extruded into an atmosphere of air whereby the inflated microcellular structure initially produced collapses spontaneously due to diffusion of the solvent outwardly through the cell walls.

5. A method as defined in claim 1 wherein the collapsed structure is produced by immersing a preformed microcellular structure at about atmospheric pressure in a fluid bath consisting of a mixture of an impermeant inflatant and a plasticizer for the polymer of which the cell walls are composed, the plasticizer being at least twice as permeant to the cell walls as air, whereupon the normally impermeant inflatant diffuses into the cells, then transferring the structure from the bath to an atmosphere of a gas no more permeant to the cell walls than air.

6. Method as defined in claim 1 wherein said vapor is vapor of a liquid having a boiling point above room temperature, and wherein the structure is collapsed by cooling the structure to below said boiling point to condense the vapor.

7. A method as defined in claim 1 wherein said microcellular structure is in the form of an elongated shape material and wherein said mechanical restraining forces are imposed by winding said elongated shape material under tension about a core.

8. A method as defined in claim 7 wherein said elongated shape material is a filament.

9. A method as defined in claim 7 wherein said elongated shape material is a sheet.

References Cited
UNITED STATES PATENTS

| | | | |
|---|---|---|---|
| 2,860,378 | 11/1958 | Urchick | 264—45 |
| 3,030,623 | 4/1962 | Lehti et al. | 18—59 |
| 3,284,275 | 11/1966 | Nelson | 161—168 |

JULIUS FROME, Primary Examiner

P. A. LEIPOLD, Assistant Examiner

U.S. Cl. X.R.

260—2.5; 264—88, 204, 210, 321, 342